(12) United States Patent
Zhang

(10) Patent No.: US 7,647,069 B2
(45) Date of Patent: Jan. 12, 2010

(54) SINGLE OSCILLATOR DSSS AND OFDM RADIO RECEIVER

(75) Inventor: Yifeng Zhang, San Jose, CA (US)

(73) Assignee: NXP B.V., Eindhoven (NL)

( * ) Notice: Subject to any disclaimer, the term of this patent is extended or adjusted under 35 U.S.C. 154(b) by 1420 days.

(21) Appl. No.: 10/280,749

(22) Filed: Oct. 25, 2002

(65) Prior Publication Data

US 2004/0203557 A1 Oct. 14, 2004

(51) Int. Cl.
*H04M 1/00* (2006.01)
*H01Q 11/12* (2006.01)
*H04B 1/38* (2006.01)
*H04L 27/00* (2006.01)
*H03K 9/00* (2006.01)

(52) U.S. Cl. .............. 455/552.1; 455/553.1; 455/127.4; 375/219; 375/295; 375/316

(58) Field of Classification Search ............... 455/533.1, 455/95, 113, 127.4, 150.1, 205, 457, 73, 455/75, 84, 552.1, 192.2, 553.1; 370/335, 370/208, 350; 375/219, 260, 271, 295, 302, 375/316, 322, 324, 340, 225, 226, 279–281, 375/326, 327, 329, 332, 343, 256, 355, 344; 329/304, 306–308
See application file for complete search history.

(56) References Cited

U.S. PATENT DOCUMENTS

| | | | |
|---|---|---|---|
| 5,881,369 A * | 3/1999 | Dean et al. | 455/78 |
| 5,889,759 A | 3/1999 | McGibney et al. | |
| 6,405,093 B1 * | 6/2002 | Malcolm et al. | 700/94 |
| 6,631,256 B2 * | 10/2003 | Suominen | 455/302 |
| 6,944,219 B2 * | 9/2005 | Mathe | 375/232 |
| 2002/0145551 A1 | 10/2002 | Arnaud et al. | |
| 2002/0186795 A1 * | 12/2002 | Ohtaki | 375/340 |
| 2003/0050085 A1 * | 3/2003 | Peluso et al. | 455/522 |
| 2003/0078011 A1 * | 4/2003 | Cheng et al. | 455/73 |
| 2003/0086479 A1 * | 5/2003 | Naguib | 375/144 |
| 2003/0207668 A1 * | 11/2003 | McFarland et al. | 455/3.01 |

FOREIGN PATENT DOCUMENTS

| | | |
|---|---|---|
| EP | 656698 A1 | 11/1994 |
| EP | 757446 | 2/1997 |
| EP | 1 170 874 | 1/2002 |
| JP | 1997-191253 | 7/1997 |
| JP | 2002-528985 | 9/2002 |

(Continued)

OTHER PUBLICATIONS

English translation of Office Action from Japanese patent appln. No. 2004-550865, dated Jul. 17, 2009.

*Primary Examiner*—George Eng
*Assistant Examiner*—Nam Huynh

(57) ABSTRACT

A transmitter and/or receiver includes a single crystal clock oscillator circuit and a sample rate converter (SRC) that selectively generates samples at an alternative frequency for subsequent transmission or decoding. A 40 MHz crystal provides the clock signal for the digital-to-analog and analog-to-digital converters that are used to convert the samples to and from analog form. In an IEEE 802.11-compatible embodiment, the 802.11a compatible 20 MHz OFDM samples are converted to and from analog form directly, whereas a sample rate converter converts the 802.11b compatible 22 MHz DSSS samples to and from 40 MHz samples to provide compatibility with the 40 MHz analog conversions.

13 Claims, 1 Drawing Sheet

FOREIGN PATENT DOCUMENTS

| | | |
|---|---|---|
| JP | 2002-368621 | 12/2002 |
| JP | 2003-298456 | 10/2003 |
| JP | 2004-503124 | 1/2004 |
| WO | WO 01/95579 A2 | 12/2001 |
| WO | WO 02 21688 | 3/2002 |
| WO | WO 02/27953 A1 * | 4/2002 |

* cited by examiner

SINGLE OSCILLATOR DSSS AND OFDM RADIO RECEIVER

BACKGROUND OF THE INVENTION

1. Field of the Invention

This invention relates to the field of communications, and in particular to a radio receiver that is configured to receive either DSSS (Direct Sequence Spread Spectrum) or OFDM (Othogonal Frequency Division Multiplexing) communications.

2. Description of Related Art

The IEEE 802.11g specification calls for wireless communications systems that can communicate at higher data rates than conventional 802.11b devices, yet be compatible with such 802.11b devices. Within an 802.11g signal, both "serial" (802.11b-compatible DSSS) modulation and "parallel" (802.11a-compatible OFDM) modulation are employed.

IEEE 802.11b DSSS devices are configured to operate with a 'chip rate' of 11 Mega-chips-per-second (Mcps), and must be sampled at integer multiples of 11 MHZ, while IEEE 802.11a OFDM devices require a sampling rate of 20 Megacycles-per-second (MHz), or integer multiples thereof. Conventionally, dual clock-generating devices (typically crystal devices) are used to provide these sampling clock signals, and to provide the required analog-to-digital and digital-to-analog conversions of the sample streams at each sampling frequency.

PCT patent application PCT/US01/17525 "DUAL PACKET CONFIGURATION FOR WIRELESS COMMUNICATION", teaches the use of two clock sources for dual-mode wireless communications, and is incorporated by reference herein.

The referenced patent application also proposes a scheme wherein the transmission of dual-mode communications are based on a single clock source, thereby allowing a single clock source to be used at the receivers. In proposing this single-clock based system, however, the referenced patent notes that the resultant transmitted signals are not, per se, compatible with the existing 802.11a, 802.11b, and 802.11g specification.

BRIEF SUMMARY OF THE INVENTION

It is an object of this invention to provide a DSSS and OFDM transmitter and/or receiver that uses a single clock generator. It is a further object of this invention to provide a dual-mode transmitter and/or receiver that is compatible with IEEE 802.11a, 802.11b, and 802.11g and uses a single clock generator.

These objects and others are achieved by providing a transmitter and/or receiver that includes a single crystal clock oscillator circuit and a sample rate converter (SRC) that selectively generates samples at an alternative frequency for subsequent transmission or decoding. A 40 MHz crystal provides the clock signal for the digital-to-analog and analog-to-digital converters that are used to convert the samples to and from analog form. The 802.11a compatible 20 MHz OFDM samples are converted to and from analog form directly, whereas a sample rate converter converts the 802.11b compatible 22 MHz DSSS samples to and from 40 MHz samples to provide compatibility with the 40 MHz analog conversion.

BRIEF DESCRIPTION OF THE DRAWINGS

The invention is explained in further detail, and by way of example, with reference to the accompanying drawing wherein.

DETAILED DESCRIPTION OF THE INVENTION

Figure 1:
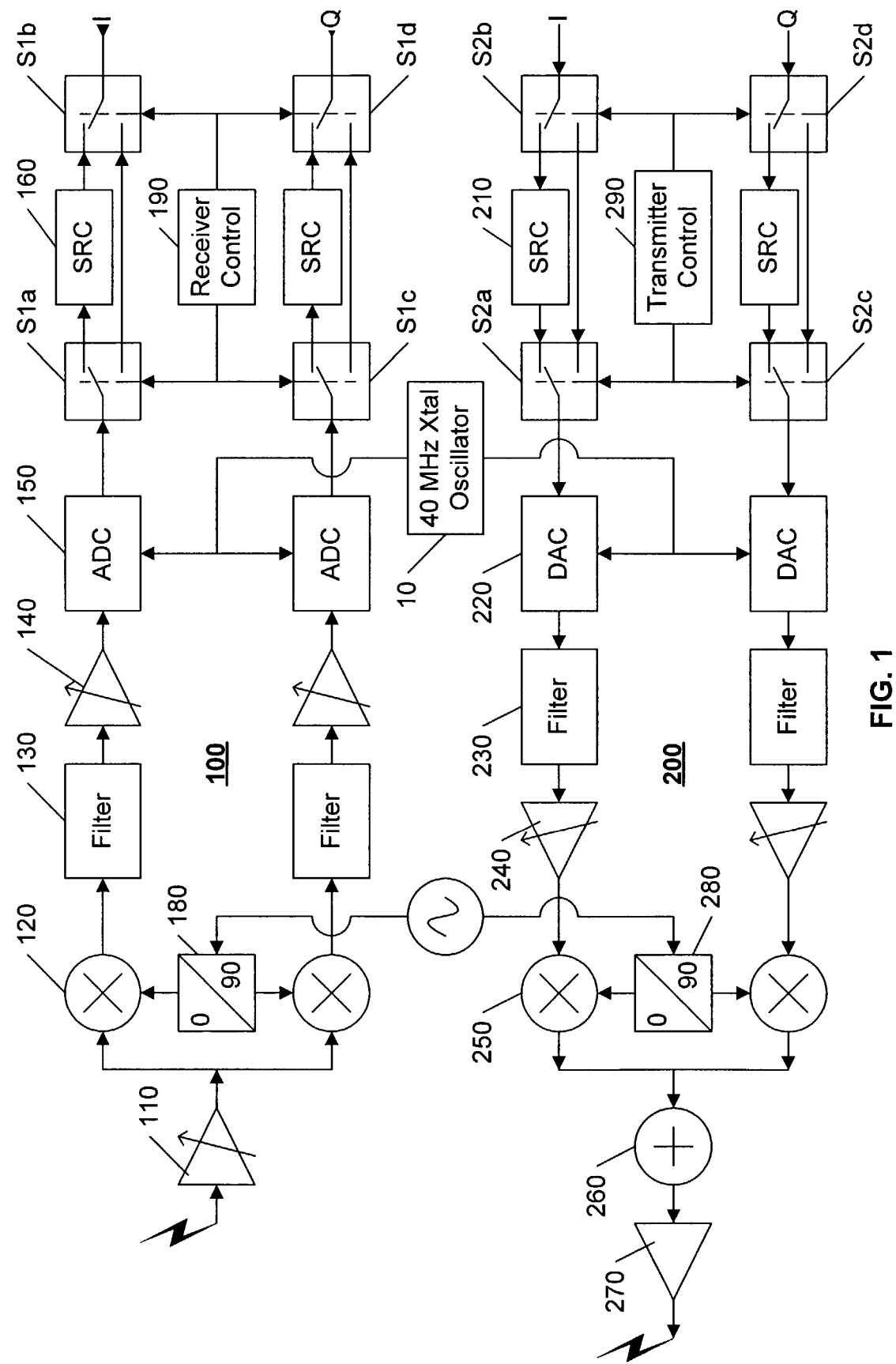
FIG. 1 illustrates an example block diagram of a DSSS and OFDM compatible transceiver that uses a single clock oscillator in accordance with this invention.

FIG. 1 illustrates an example block diagram of a DSSS and OFDM compatible transceiver that uses a single clock oscillator 10 in accordance with this invention. The transceiver includes a receiver section 100, and a transmitter section 200. Each of the receiver and transmitter are functionally independent, and are presented herein as individual embodiments, although, as the FIGURE illustrates, a preferred embodiment includes both a receiver 100 and a transmitter 200.

The receiver 100 includes a tunable front end 110 whose output is demodulated by a quadrature demodulator to provide quadrature output signals I and Q. For ease of illustration, only one branch of the quadrature demodulator is described herein, the other branch being functionally equivalent, but operating at an orthogonal phase provided by the quadrature phase generator 180. The output of the front end 110 is demodulated by a mixer 120, and filtered by a filter 130. A tunable amplifier 140 provides a baseband analog signal, which is converted into digital samples via the analog-to-digital converter (ADC) 150.

Note that the samples from the ADC 150 are generated using the clock oscillator 10, which, for 802.11a compatibility, is a 40 MHz crystal oscillator. These 40 MHz samples are generated regardless of whether the received signal corresponds to an IEEE 802.11a-compatible OFDM signal or an IEEE 802.11b-compatible DSSS signal. The single clock oscillator 10 is preferably selected to be a multiple of the 20 MHz OFDM signal, rather than a multiple of the 11 MHz DSSS signal, because the OFDM signal is more time-critical than the DSSS signal.

A receiver controller 190 controls a multipole switch S1a-d to selectively convert the samples from the ADC 150 to samples at an alternative sample rate. Because the OFDM signal is time critical, the default samples are a multiple of the OFDM 20 MHz sample rate, and thus a sample rate conversion is not required, and the sample rate converter 160 is bypassed. When the receiver determines that the input is not an OFDM signal, the receiver controller 190 enables the switch S1a-d, and the sample rate converter 160 is enabled to convert the samples from the ADC 150 to a different sample rate. In the example of FIG. 1, the sample rate converter 160 is configured to convert the 40 MHz samples from the ADC 150 into 22 MHz samples, for compatibility with the IEEE 802.11b DSSS signal standard of 11 MHz. Thus, although a 40 MHz clock generator is used to sample the received signal, the samples that are provided to the subsequent processors of the received samples (not illustrated) are provided samples at a multiple of 11 MHz, when the received signal is determined not to be a 20 MHz OFDM signal, thereby facilitating the processing of these samples as DSSS samples that conform to the 802.11b standard of 11 Mcps.

At the transmitter 200, a similar architecture is employed. In this case, however, the input samples are received from a source (not illustrated) as either DSSS or OFDM samples, each at a different sampling rate. In accordance with a second aspect of this invention, the transmitter 200 is configured to modulate the input signal to provide a transmission signal that is transmitted by a transmit device 270. Illustrated in FIG. 1 is a quadrature transmitter 200; for ease of reference, only a single path of the quadrature signal input path is detailed herein, the operation of the othogonal stage being equivalent.

As noted above, the input to the transmitter 200 are digital samples of the information that is to be transmitted, these samples occurring at either a first or second sample rate. A sample rate converter 210 converts these input samples into samples consistent with the frequency of the single clock generator 10, if the input samples are not already consistent with the frequency of the clock generator 10. In a preferred embodiment of this invention, the common clock 10 operates at a frequency that is a multiple of the IEEE 802.11a OFDM base frequency of 20 MHz. As illustrated, the preferred clock oscillator 10 is a 40 MHz crystal generator. The sample rate converter 210 is enabled by the transmitter controller 290, via the multipole switch S2*a-d*, when the input corresponds to a DSSS sample stream. In the example embodiment, the DSSS input is provided as a 44 MHz sample stream, and the sample rate converter 210 is a 44 MHz to 40 MHz sample rate converter.

A digital-to-analog (DAC) converter 220 converts the 40 MHz samples corresponding to either the input sample stream or the converted sample stream from the SRC 210 into an analog signal that is filtered by the filter 230 and tuned amplifier 240, then modulated by the mixer 250. The adder 260 combines the quadrature signals, and an amplifier 270 prepares the composite signal for transmission.

In a preferred embodiment, the sample rate converters 160, 210 are realized using linear interpolators and polyphase filters, common in the art.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A dual-mode communications device that is configured to operate in a first mode to process a first type of signal and in a second mode to process a second different type signal, the device comprising:
   an oscillator that provides a clock signal at a first sample frequency,
   a receiver that includes:
      a tuner that is configured to receive an incoming signal and provide therefrom an analog received signal,
      an analog-to-digital converter, operably coupled to the tuner and to the oscillator, that is configured to convert the analog received signal into a first stream of digital samples at the first sample frequency,
      a receiver controller that is configured to determine whether the incoming signal is of the first type or the second type and to provide a receiver control signal indicative of the type of the incoming signal, and
      a receiver sample rate converter operably coupled to the analog-to-digital converter and the receiver controller, wherein, in the first mode, the device is configured to bypass the receiver sample rate converter responsive to the receiver control signal indicating that the incoming signal is of the first type, and, in the second mode, the device is configured to enable the receiver sample rate converter to convert the digital samples at the first sample frequency to a second stream of digital samples at a second sample frequency responsive to the receiver control signal indicating that the incoming signal is of the second type.

2. The dual-mode communications device of claim 1, wherein
   the tuner is further configured to provide a quadrature analog received signal that is orthogonal in phase to the analog received signal, and
   the dual-mode communications device further includes:
      another analog-to-digital converter, operably coupled to the tuner, that is configured to convert the quadrature analog received signal into another first stream of quadrature digital samples at the first sample frequency, and
      another receiver sample rate converter, operably coupled to the other analog-to digital converter and the receiver controller, wherein, in the first mode, the device is configured to bypass the other receiver sample rate converter responsive to the receiver control signal indicating that the incoming signal is of the first type, and, in the second mode, the device is configured to enable the other receiver sample rate converter to convert the quadrature digital samples at the first sample frequency to another second stream of quadrature digital samples at the second sample frequency responsive to the receiver control signal indicating that the incoming signal is of the second type.

3. The dual-mode communications device of claim 2, wherein the tuner includes:
   a tunable front-end that is configured to receive the incoming signal and provide therefrom a select received signal,
   a quadrature demodulator, operably coupled to the tunable front-end, that receives the selected received signal and provide therefrom a pair of quadrature signals, and
   a pair of filters, operably coupled to the quadrature demodulator, that is configured to receive the pair of quadrature signals, and provide therefrom the analog received signal and the quadrature analog received signal.

4. The dual-mode communications device of claim 1, wherein
   the first sample frequency corresponds to an integer multiple of a first base frequency of an IEEE 802.11a-compatible OFDM signal, and
   the second sample frequency corresponds to an integer multiple of a second base frequency of an IEEE 802.11b-compatible DSSS signal.

5. The dual-mode communications device of claim 1, wherein
   the first sample frequency is nominally 40 MHz, and
   the second sample frequency is nominally 22 MHz.

6. The dual-mode communications device of claim 1, further comprising:
   a transmitter that includes:
      an input stage that is configured to receive an input sample stream and to provide therefrom a transmit sample stream at the first sample frequency, and includes:
         a transmitter sample rate converter that is configured to selectively convert the input sample stream at the second sample frequency to a converted sample stream at the first sample frequency, and
         a transmitter controller that is configured to selectively enable the transmitter sample rate converter so that the transmit sample stream corresponds to:
            the input sample in a first transmit mode of the dual-mode communications device, and
            the converted sample stream in a second transmit mode of the dual-mode communications device, and a digital-to-analog converter, operably coupled to the input stage and to the oscillator, that is configured to convert the transmit sample stream at the first sample frequency to an analog transmit signal, and an output stage that is configured to transmit the analog transmit signal.

7. The dual-mode communications device of claim 6, wherein the first sample frequency corresponds to an integer multiple of a first base frequency of an IEEE 802.11a-compatible OFDM signal, and the second sample frequency corresponds to an integer multiple of a second base frequency of an IEEE 802.11b-compatible DSSS signal.

8. The dual-mode communications device of claim 6, wherein the first sample frequency is nominally 40 MHz, and
the second sample frequency is nominally 22 MHz.

9. A dual-mode communications device comprising:

an oscillator that provides a clock signal at a first sample frequency, a transmitter that includes:

an input stage that is configured to receive an input sample stream and to provide therefrom a transmit sample stream at the first sample frequency, and includes:

a transmitter sample rate converter that is configured to selectively convert the input sample stream at a second sample frequency to a converted sample stream at the first sample frequency, and a transmitter controller that is configured to selectively enable the transmitter sample rate converter so that the transmit sample stream corresponds to:

the input sample stream in a first transmit mode of the dual-mode communications device, and the converted sample stream in a second transmit mode of the dualmode communications device, and a digital-to-analog converter, operably coupled to the input stage and to the oscillator, that is configured to convert the transmit sample stream at the first sample frequency to an analog transmit signal, and an output stage that is configured to transmit the analog transmit signal.

10. The dual-mode communications device of claim 9, wherein the input stage is further configured to receive a quadrature input sample stream and to provide therefrom a quadrature transmit sample stream at the first sample frequency, and includes:

an other transmitter sample rate converter that is configured to selectively convert the quadrature input sample stream at the second sample frequency to a converted quadrature sample stream at the first sample frequency, and the transmitter controller is further configured to selectively enable the other transmitter sample rate converter so that the quadrature transmit sample stream corresponds to:

the quadrature input sample stream in the first transmit mode of the dual-mode communications device, and the converted quadrature sample stream in the second transmit mode of the dual-mode communications device, and an other digital-to-analog converter, operably coupled to the input stage and to the oscillator, that is configured to convert the quadrature transmit sample stream at the first sample frequency to a quadrature analog transmit signal, and the output stage is further configured to transmit a composite of the analog transmit signal and the quadrature analog transmit signal.

11. The dual-mode communications device of claim 10, wherein the output stage includes:

a pair of filters that are configured to receive the analog transmit signal and the quadrature analog transmit signal, provide therefrom a pair of filtered quadrature signals, and a quadrature modulator, operably coupled to the pair of filters, that receives the pair of filtered quadrature signals and provides therefrom the composite of the analog transmit signal and the quadrature analog transmit signal.

12. The dual-mode communication device of claim 9, wherein the first sample frequency corresponds to an integer multiple of a first base frequency of an IEEE 802.11a-compatible OFDM signal, and the second sample frequency corresponds to an integer multiple of a second base frequency of an IEEE 802.11b-compatible DSSS signal.

13. The dual-mode communications device of claim 9, wherein the first sample frequency is nominally 40 MHz, and
the second sample frequency is nominally 22 MHz.

* * * * *